United States Patent [19]
Sugiyama et al.

[11] Patent Number: 5,939,481
[45] Date of Patent: Aug. 17, 1999

[54] POLYOXYMETHYLENE COMPOSITIONS

[75] Inventors: Noriyuki Sugiyama; Hiroyuki Hase, both of Shizuoka, Japan

[73] Assignee: Polyplastics Co., Ltd., Japan

[21] Appl. No.: 08/877,993

[22] Filed: Jun. 18, 1997

[30] Foreign Application Priority Data

Jun. 19, 1996 [JP] Japan ................................. 8-158345

[51] Int. Cl.$^6$ ...................................................... C08K 3/38
[52] U.S. Cl. .......................... 524/405; 524/424; 524/425; 524/433; 524/593
[58] Field of Search .................................... 524/593, 405, 524/433, 425, 424

[56] References Cited

U.S. PATENT DOCUMENTS 5,137,958  8/1992  Matsunami et al. ..................... 524/405
5,364,900  11/1994  Hata et al. .............................. 524/405

*Primary Examiner*—Veronica P. Hoke
*Attorney, Agent, or Firm*—Nixon & Vanderhye P.C.

[57] ABSTRACT

A polyoxymethylene composition is reduced in mold fouling, undergoes little discoloration in molten-state residence within the cylinder of a molding machine, has improved moldability, and is reduced in formic acid generation, when compounded with a sterically hindered phenolic antioxidant (a), of a polyamide (b), at least one metal compound selected among oxides and carbonates of magnesium or calcium (c) and a boron compound (d).

4 Claims, No Drawings

POLYOXYMETHYLENE COMPOSITIONS

FIELD OF THE INVENTION

The present invention relates to a polyoxymethylene composition which is improved in thermal stability, particularly generation of matters adhered to a die in molding and discoloration caused by melting and residing in a molding machine and which is improved in functional faults (for example, stain caused by matters bleeding from rubber and corrosion of metallic magnetic substances), and a molded article thereof.

DESCRIPTION OF THE RELATED ART

Polyoxymethylene is prepared by polymerizing formaldehyde or trioxane which is a cyclic oligomer of formaldehyde or comonomers of trioxane and cyclic ether cyclic formal. Terminals thereof are subjected to stabilization treatment, and antioxidants and other thermal stabilizers are added to prevent decomposition.

Sterically hindered phenol compounds or sterically hindered amine compounds are proposed as antioxidants added to polyoxymethylene, and polyamide, urea derivatives, amidine compounds and hydroxides of alkaline or alkaline earth metals are proposed as other thermal stabilizers. However, they have the defects on moldability that polyoxymethylene compositions blended with these compounds are affected by heat and oxygen in the cylinder of a molding machine in molding and are liable to generate a formaldehyde odor to deteriorate working (sanitary) environment and that molding continued over a long period of time causes fine powder or a tar-like substance (MD) to stick to the inner surface of a die to bring about deterioration of a molded article's appearance. While various devices and proposals have so far been made, satisfactory results have not necessarily been obtained.

Further more improvement in the property thereof as a material has been required depending on the fields in which polyoxymethylene is used.

Examples of such requirement include improvement in functional faults in structural parts used for electric and electronic appliances, for example, audio and video appliances. That is, there are the problems that formic acid generated from a polyoxymethylene molded article causes additives contained in a rubber roller to bleed on a rubber surface and to contaminate a magnetic head through a magnetic tape and that the use thereof with metallic magnetic substances in a relatively closed condition causes magnetic substances contained in an optical magnetic disc, a metal-deposited tape and the like to be corroded. Accordingly, drastic solution thereof has been desired.

A means for solving the problems described above has been proposed by the present inventors in Japanese Patent Application No. 8-41412, in which polyoxymethylene is compounded with an antioxidant, specific magnesium oxide and polyamide. However, the new problem that the composition is notably yellowed by melting and residing in the cylinder of a molding machine has been arised, and a solution thereof has been desired.

SUMMARY OF THE INVENTION

The present inventors have investigated detailedly the amount of a resulting formic acid and moldability in various combined systems of metal compounds such as magnesium oxide with thermal stabilizers. As a result thereof, they have found that in a system in which polyoxymethylene is compounded with an antioxidant, a specific metal compound, that is, magnesium oxide and/or calcium oxide, and a very small amount of polyamide as additives, various problems can be solved in good balance by further compounding a boron compound and thus come to complete the present invention.

That is, the present invention relates to a polyoxymethylene composition comprising a polyoxymethylene, 0.01 to 3 % by weight of a sterically hindered phenolic antioxidant (a), 0.001 to 0.3 % by weight of a polyamide (b), 0.001 to 0.5% by weight of at least one metal-containing compound (c) selected from among oxides and carbonate of magnesium and calcium, and 0.001 to 0.5 % by weight of a boron compound (d), each amount being based on the polyoxymethylene.

DETAILED DESCRIPTION OF THE INVENTION

The present invention shall be explained below in detail.

The polyoxymethylene used in the present invention is a polymer compound comprising an oxymethylene group (—$CH_2O$—) as a main structural unit and may be any of polyoxymethylene homopolymers and copolymers, terpolymers and block copolymers each containing a small amount of other structural units in addition to the oxymethylene group, or may be a polymer having a branched or cross-linked molecular structure as well as a linear molecular structure. The polymerization degree thereof shall not specifically be restricted.

Next, the sterically hindered phenolic antioxidant (a) used in the present invention includes 2,2'-methylenebis(4-methyl-6-t-butylphenol), 1,6-hexanediol-bis[3-(3,5-di-t-butyl-4-hydroxyphenyl)propionate], pentaerythritol tetrakis [3-(3,5-di-t-butyl-4-hydroxyphenyl)propionate], triethylene glycol bis[3-(3,5-di-t-butyl-4-hydroxyphenyl)propionate], 1,3,5-trimethyl-2,4,6-tris(3,5-di-t-butyl-4-hydroxybenzyl) benzene, n-octadecyl-3-(4'-hydroxy-3',5'-di-t-butylphenyl) propionate, 4,4'-methylenebis-(2,6-di-t-butylphenol), 4,4'-butylidenebis(6-t-butyl-3-methylphenol), di-stearyl-3,5-di-t-butyl-4-hydroxybenzyl phosphonate, 2-t-butyl-6-(3-t-butyl-5-methyl-2-hydroxybenzyl)-4-methylphenyl acrylate, and N,N'-hexamethylenebis(3,5-di-t-butyl-4-hydroxy-hydro cinnamamide).

The amount of the sterically hindered phenolic antioxidant (a) added and compounded in the present invention is 0.01 to 3% by weight, preferably 0.05 to 0.5% by weight based on the polyoxymethylene. When this addition amount is too small, the satisfactory effects can not be obtained. On the other hand, when it is excessive, the effect of controlling the generated amount of a formic acid is saturated, and discoloration rather tends to be caused in molding (initial stage). Accordingly, both are not preferred.

The polyamide (b) used in the present invention is publicly known as a thermal stabilizer used for the polyoxymethylene in combination with a sterically hindered phenolic antioxidant, and any compound can be used. In particular, polyamides in which a part of the structure thereof is produced from ε-caprolactam and/or adipic acid and diamines are preferred and include, for example, nylon 6, nylon 6·6, nylon 6·10 and ternary copolymers thereof (6·6/6·10/6). Considering a dispersibility thereof into the polyoxymethylene, such polyamides are used preferably in the form of a dispersed matter obtained by melting and kneading once with an ethylene copolymer. Any compounds having a vinyl group can be used as a copolymer component constituting the ethylene copolymer. In particular, esters of acrylic acid and/or methacrylic acid are preferred and include, for example, methyl acrylate, ethyl acrylate, hydroxyethyl acrylate, hydroxypropyl acrylate, ethyl methacrylate and methyl methacrylate.

The amount of the polyamide (b) added and compounded in the present invention is 0.001 to 0.3% by weight, preferably 0.005 to 0.1% by weight based on the polyoxymethylene. When this addition amount is too small, the satisfactory effects can not be obtained. On the other hand, when it is excessive, the effect of thermal stability is saturated, and the polyamide itself rather becomes a matter adhered to a die to bring about a degradation in the moldability. Accordingly, both are not preferred.

The metal-containing compound (c) used in the present is oxide or carbonate of magnesium or calcium and is specifically at least one selected from magnesium oxide, calcium oxide, magnesium carbonate and calcium carbonate. The compounds having preferably a particle diameter of 100 μm or less, particularly preferably 10 μm or less are suitably used.

The amount of the metal-containing compound (c) is 0.001 to 0.5% by weight, preferably 0.005 to 0.1% by weight based on the polyoxymethylene. When this addition amount is too small, the satisfactory effects can not be obtained. On the other hand, when it is excessive, the effect of controlling the generated amount of a formic acid is saturated, and discoloration rather tends to be caused. Accordingly, both are not preferred.

The boron compound (d) used in the present invention includes boric acids such as orthoboric acid, metaboric acid and tetraboric acid, and boron oxides such as diboric trioxide, and commercial products can be used. The particle diameter thereof shall not specifically be restricted.

The amount of the boron compound (d) added and compounded in the present invention is 0.001 to 0.5% by weight, preferably 0.001 to 0.2% by weight based on the polyoxymethylene. When this addition amount is too small, the satisfactory effects can not be obtained. On the other hand, when it is excessive, the effect of controlling discoloration is saturated to rather bring about a degradation in the thermal stability. Accordingly, both are not preferred.

The sterically hindered phenolic antioxidant (a), the polyamide (b), the specific metal compound (c) and the boron compound (d) which are used in the present invention may be added to the monomer at a polymerization step of the polymer or may be added at a stabilization step of the polymer. Further, there may be used pellets formed from a master batch which is obtained by adding at least one selected from the sterically hindered phenolic antioxidant (a), the polyamide (b), the specific metal compound (c) and the boron compound (d) in advance to vinyl polymers such as polyethylene and polypropylene and/or copolymers thereof in a high concentration, or there can be used a mixture prepared by adding at lest one selected from the sterically hindered phenolic antioxidant (a), the specific metal compound (c) and the boron compound (d) in advance to the polyamide (b).

At least one nitrogenous compound other than the polyamide (b) used in the present invention and at least one organic or inorganic metal-containing compound other than the specific metal-containing compound (c) used in the present invention can further be compounded, though not essential, with the polyoxymethylene composition of the present invention according to the purposes thereof.

Various publicly known additives can further be compounded with the polyoxymethylene composition used in the present invention. They include, for example, various colorants, mold releasing agents, nuclear agents, anti-static agents, other surfactants and various polymers. Further, publicly known inorganic or organic, metallic, fibrous, tabular or powdery/granular fillers can be compounded as well alone or in combination of two or more kinds thereof as long as the performances of the molded article intended in the present invention are not reduced to a large extent. Examples of such inorganic fillers include glass fiber, potassium titanate fiber, glass beads, talc, mica, white mica, wollastnite and calcium carbonate. However, they shall by no means be restricted to these compounds. The polyoxymethylene molded article according to the present invention can readily be prepared by publicly known methods generally used for preparing conventional resin molded articles. There can be used all of methods such as, for example, a method in which after mixing respective components, the mixture is kneaded and extruded by means of a single shaft or double shaft extruding machine to prepare pellets; then, the pellets are blended (diluted) in a prescribed amount and molded to obtain a molded article having an intended composition after molding. Preferred for improving the dipersibility of the additives is a method in which in preparing the composition used for such a molded article, a part or all of the polyoxymethylene which is a base material is pulverized and mixed with the other components; then, the mixture is extruded.

EXAMPLES

The present invention shall specifically be explained below with reference to examples, but the present invention shall not be restricted to them.

The evaluation methods shown in the following examples shall be described below.

1) Amount of formic acid generated from molded article:

10 g of a polyoxymethylene molded article which was cut to a total surface area of 10 cm² was put in a closed vessel (capacity: 100 ml) so that it was not dipped directly in 1 ml of deionized water and left for standing at 60° C. and 90% RH for 168 hours. Then, water contained in this closed vessel was diluted to 100 ml, and the concentration of formic acid contained in this solution was measured by means of an ion chromatograph (IC500 manufactured by Yokokawa Hewlett Packard Co., Ltd., using a column for organic acid and a 0.1 mM perchloric acid aqueous solution as a carrier), whereby the amount of resulting formic acid was determined. The amount of formic acid generated was shown by converting the value obtained by this ion chromatograph to a value per unit surface.

2) Moldability (amount of matters adhered to die)

A sample of the polyoxymethylene composition is continuously (24 hours) injection-molded into a molded article having a specific shape under the following conditions to determine the amount of matters adhered to a die. That is, fouling of the die caused by continuously molding was evaluated by observation with naked eyes according to the following five grades.

Molding conditions:

Injection-molding machine: Toshiba IS80EPN (manufactured by Toshiba Machinery Co., Ltd.)

Cylinder temperature: 210° C.

Injection pressure: 750 kg/cm²

Injection time: 4 seconds

Cooling time: 3 seconds

Die temperature: 30° C.

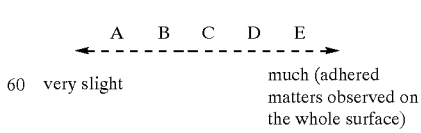

3) Moldability (discoloration degree after melting and residing):

A sample of the polyoxymethylene composition is caused to reside in the cylinder of the preceding injection-molding machine set up at 210° C. for 2 hours and then molded into a flat plate having dimensions of 50×70×3 (mm) to evaluate the appearance of the molded article. That is, the hue (L, a, b) of the molded article was measured by means of a color sensor Z-300A manufactured by Nippon Denshoku Kogyo KK to calculate deviation (ΔE) from the initial hue based on the following equation:

$$\Delta E = [(L_1-L_0)^2 + (a_1-a_0)^2 + (b_1-b_0)^2]^{1/2}$$

wherein L, a and b each are the values of colors measured with a color-difference meter; an inferior figure 1 attached to L, a and b means the hue obtained after residing for 2 hours, and an inferior figure 0 means the hue obtained in an ordinary cycle.

EXAMPLES 1 TO 10

The sterically hindered phenolic antioxidants (a), the polyamides (b), the specific metal compounds (c) and the boron compounds (d) each shown in Table 1 were added and blended with a polyoxymethylene copolymer (trade name: DURACON, manufactured by Polyplastics Co., Ltd.) in proportions shown in Table 1 to obtain pelletized compositions with an extruding machine, and they were evaluated for the items described above. The results thereof are shown in Table 1.

COMPARATIVE EXAMPLES 1 TO 6

For the sake of comparison, the pelletized compositions were prepared in the same manner as in Examples 1 to 10, except that the polyamide (b), the specific metal compound (c) and the boron compound (d) were not compounded, or the boron compound (d) was compounded in an amount falling outside the range of the present invention, and they were evaluated for the items described above. The results thereof are shown in Table 1.

The following sterically hindered phenolic antioxidants, polyamides, specific metal compounds and boric compounds were used;

1. Sterically hindered phenolic antioxidant:

a-1; pentaerythritol tetrakis[3-(3,5-di-t-butyl-4-hydroxyphenyl)propionate], a-2; triethylene glycol bis[3-(3-t-butyl-methyl-4-hydroxyphenyl)propionate]

2. Polyamide:

b-1; nylon 6 b-2; ternary polyamide copolymer (6·6/6·10/6)

3. Specific metal compound c-1; magnesium oxide c-2; calcium oxide c-3; magnesium carbonate 4. Boron compound:

d-1; orthoboric acid d-2; metaboric acid

TABLE 1

| | | Example | | | | | | | |
|---|---|---|---|---|---|---|---|---|---|
| | | 1 | 2 | 3 | 4 | 5 | 6 | 7 | 8 |
| (a) sterically hindered phenolic antioxidant (wt. %) | | a-1 0.5 | a-1 0.5 | a-1 0.5 | a-1 0.5 | a-1 0.5 | a-1 0.5 | a-1 0.5 | a-1 0.5 |
| (b) polyamide (wt. %) | | b-1 0.03 | b-1 0.03 | b-1 0.03 | b-1 0.07 | b-2 0.03 | b-1 0.03 | b-1 0.03 | b-1 0.03 |
| (c) specific metal compound (wt. %) | | c-1 0.01 | c-1 0.01 | c-1 0.01 | c-1 0.01 | C-1 0.01 | c-1 0.05 | c-2 0.01 | c-3 0.05 |
| (d) boric acid (wt. %) | | d-1 0.005 | d-1 0.03 | d-1 0.10 | d-1 0.03 | d-1 0.03 | d-1 0.03 | d-1 0.03 | d-1 0.03 |
| generated amount of formic acid ($\mu$m/cm$^2$) | | 0.77 | 0.78 | 0.77 | 0.72 | 0.80 | 0.40 | 0.83 | 0.63 |
| moldability | matters adhered to mold | A | A | A | A | A | A | A | A |
| | discoloration degree after melting and residing | 2.3 | 2.0 | 1.2 | 2.8 | 2.1 | 2.6 | 2.8 | 2.5 |

| | | Example | | Comparative Example | | | | | |
|---|---|---|---|---|---|---|---|---|---|
| | | 9 | 10 | 1 | 2 | 3 | 4 | 5 | 6 |
| (a) sterically hindered phenolic antioxidant (wt. %) | | a-1 0.5 | a-2 0.5 | a-1 0.5 | a-1 0.5 | — | a-1 0.5 | a-1 0.5 | a-1 0.5 |
| (b) polyamide (wt. %) | | b-1 0.03 | b-1 0.03 | b-1 0.03 | — | b-1 0.03 | b-1 0.03 | b-1 0.03 | b-1 0.03 |
| (c) specific metal compound (wt.%) | | c-1 0.01 | c-1 0.01 | c-1 0.01 | c-1 0.01 | c-1 0.01 | — | c-1 0.01 | c-3 0.05 |
| (d) boric acid (wt. %) | | d-2 0.03 | d-1 0.03 | — | d-1 0.03 | d-1 0.03 | d-1 0.03 | d-1 1.0 | — |
| generated amount of | | | | | | | | | |

TABLE 1-continued

| | | | | | | | | | |
|---|---|---|---|---|---|---|---|---|---|
| formic acid ($\mu$m/cm$^2$) | | 0.80 | 0.76 | 0.76 | 0.90 | 1.88 | 2.33 | 1.64 | 0.60 |
| moldability | matters adhered to mold | A | A | A | E | E | A | D | A |
| | discoloration degree after melting and residing | 2.3 | 2.0 | 1.2 | 2.8 | 2.1 | 2.6 | 2.8 | 2.5 |

Note) *Because of heavy decomposition in residing molding machine, the molded article could not be obtained, and therefore no data are available.

As apparent from the preceding explanation and examples, the polyoxymethylene composition of the present invention gives less fouling to a die even after continuous molding for long time, has less discoloration degree even after prolonged molten-state residence in the cylinder of a molding machine and is improved in moldability. Further, the composition has less generated amount of formic acid and therefore can suitably be used as a part material for electric and electronic appliances, particularly audio and video appliances.

We claim:

1. A polyoxymethylene composition comprising a polyoxymethylene, 0.01 to 3% by weight of a sterically hindered phenolic antioxidant (a), 0.001 to 0.3% by weight of a polyamide (b), 0.001 to 0.5% by weight of at least one metal compound (c) selected from the group consisting of oxides of magnesium or calcium and carbonates of magnesium or calcium, and 0.001 to 0.5% by weight of a boron compound (d) which is at least one selected from the group consisting of orthoboric acid, metaboric acid, tetraboric acid and diboron trioxide, each amount being based on the weight of the polyoxymethylene.

2. A polyoxymethylene composition as claimed in claim 1, wherein the metal compound (c) is at least one member selected from the group consisting of magnesium oxide, calcium oxide, and magnesium carbonate.

3. A polyoxymethylene composition as claimed in claim 1, wherein part of the polyamide (b) is a copolymer of ε-caprolactam and/or adipic acid with a diamine.

4. A polyoxymethylene composition as claimed in claim 1, wherein the amount of the polyamide (b) is 0.005 to 0.1% by weight based on the polyoxymethylene.

* * * * *